Sept. 9, 1941.  T. L. FAWICK  2,255,243
DRIVING CLUTCH
Filed Aug. 25, 1937
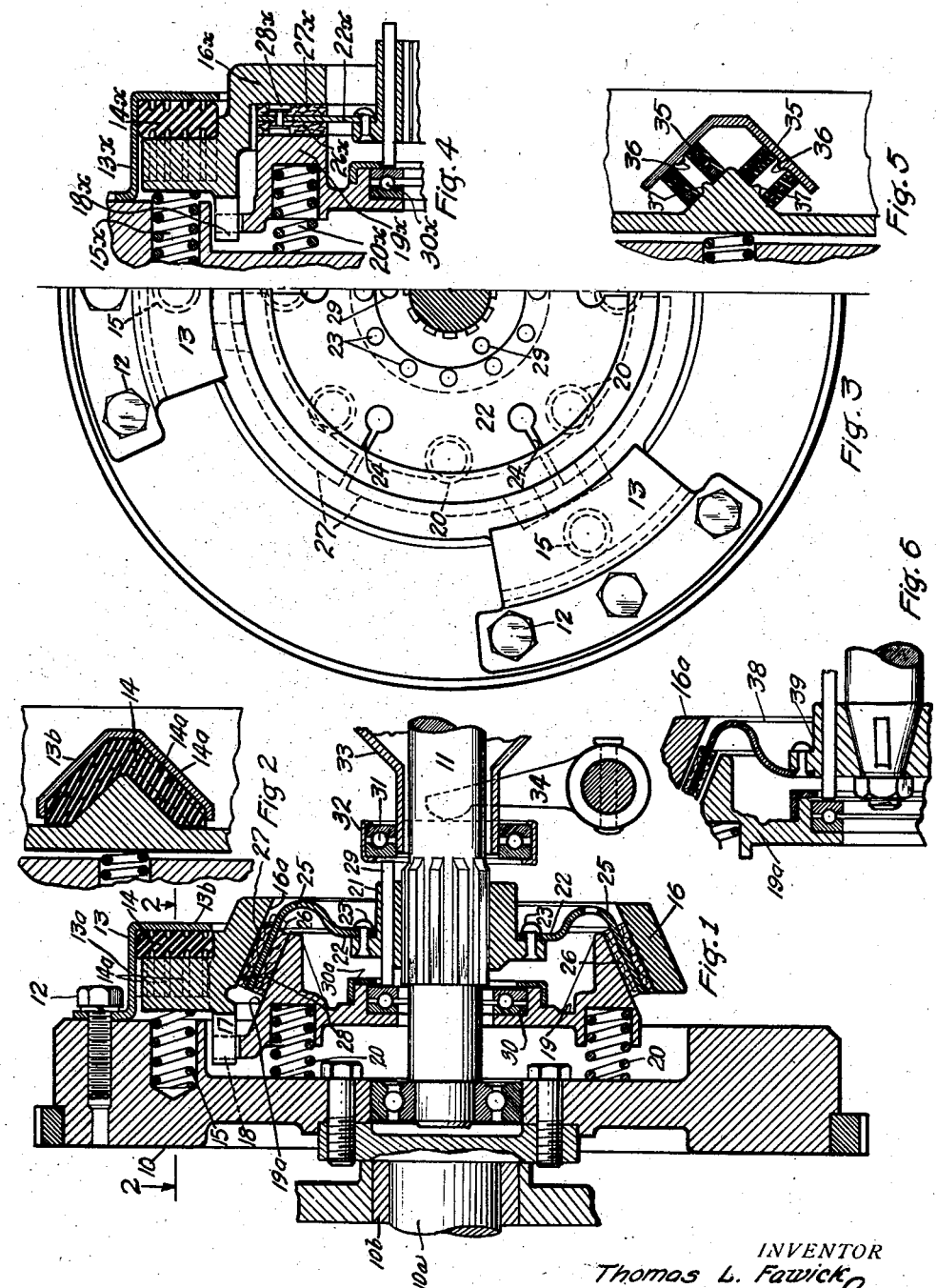
INVENTOR
Thomas L. Fawick
BY Willard D. Eskin
ATTORNEY Patented Sept. 9, 1941

2,255,243

UNITED STATES PATENT OFFICE 2,255,243

DRIVING CLUTCH

Thomas L. Fawick, Akron, Ohio, assignor to The Fawick General Company, Inc., a corporation of Indiana Application August 25, 1937, Serial No. 160,880

23 Claims. (Cl. 192—68)

This invention relates to driving clutches for power transmission.

Its chief objects are to provide a desirable torque-cushioning modulus; to provide a torque-cushioning member or members and associated parts in such relation as to provide a positive although cushioned drive; to provide a simple, compact and economical assembly employing the "single dry-plate" principle, with two oppositely facing friction surfaces on the driven member or on the driving member, in either a disc type or a cone type clutch; to provide for effective dissipation of frictional heat; and to provide, in conjunction with any or all of these advantages, a desirable flexible-coupling effect in the clutch assembly.

Some of the features shown in the present application are more broadly described and claimed in my co-pending application Serial No. 99,867, filed September 8, 1936, and issued as Patent No. 2,120,400 on June 14, 1938.

In the accompanying drawing:

Fig. 1 is a vertical, axial section of a clutch assembly embodying my invention in its preferred form.

Fig. 2 is a fragmentary section on line 2—2 of Fig. 1.

Fig. 3 is an elevational view of the rear face of the clutch assembly of Fig. 1.

Fig. 4 is a fragmentary vertical, axial section illustrating the application of certain features of the invention to a disc type clutch.

Fig. 5 is a section, corresponding to that of Fig. 2, illustrating an alternative type of torque-cushioning and mis-alignment-compensating element.

Fig. 6 is a fragmentary section of a modification.

Referring to the drawing, the invention is here shown as being embodied in the clutch assembly of an automobile, of which 10 is the fly-wheel of the motor, 11 the stem gear shaft, and 11a a ball bearing interposed between the two. The fly-wheel is shown as being mounted upon the crank-shaft 10a of an automobile engine, and the adjacent one of its bearings is shown at 10b.

Secured to the rear face of the outer part of the fly-wheel by tap screws 12, 12 are circumferentially spaced stampings 13, 13, here shown so spaced as to call for three of them, each of them comprising an axially disposed base portion 13a (Fig. 1) and a radially disposed skirt 13b (Fig. 2) which in tangential section is of V-shape, as shown in Fig. 2.

Seated in the V-shaped portion of each of the stampings is a cushioning member which is here shown as a V-shaped block of rubber 14, preferably formed on each of its radially disposed faces with a series of circumferentially disposed grooves 14a, 14a to give it greater yieldability and better frictional grip.

Bearing against the faces of the cushioning members 14 which are nearest the fly wheel, under the constant force of a circumferential series of springs 15, 15, is a female cone-clutch member 16, of which the friction face, 16a, preferably is of a rather high pitch with relation to the axis of the assembly, to avoid grabbing of the clutch, and this female clutch member is formed with a circumferential series of forwardly extending lugs such as the lug 17 which slidably fit between pairs of lugs, such as the lug 18, which are formed on the periphery of a male cone-clutch member 19. The latter has a friction face 19a of the same pitch as that of the female cone-clutch member 16 and is constantly urged toward the last mentioned member by a circumferential series of springs, such as the spring 20, interposed between it and the fly-wheel, with which it is compelled to rotate by reason of the slidably interlocked lugs 17, 18. Suitable means, hereinafter described, is provided for moving it away from the female cone-clutch member 16, against the force of the springs 20.

These male and female cone-clutch members, both, are thus parts of the driving portion of the assembly.

The driven portion of the assembly comprises a hub member 21 splined upon the stem gear shaft 11 and a dished stamping 22 secured to it by rivets 23, 23 and formed with radial slots 24, 24 to provide a circumferential series of arms 25, 25, the outer portions of the series of arms extending into the conical space between the friction faces of the members 16 and 19. Two circumferential series of arcuate heat insulating friction facings 26, 26 and 27, 27 are secured to the inner and the outer faces of the arms 25, as by means of rivets such as the rivet 28, this arrangement being such that the arms 25 of the relatively light stamping 22 are insulated from the frictional heat, which consequently is received chiefly by the relatively thick members 16 and 19, which have the greater capacity for absorbing it.

The arms 25, provided by the slotting of the member 22, while being of a shape such as to have ample strength circumferentially of the assembly for transmitting the torque, have such resilience in all directions in their parts that are between the members 16 and 19 as to permit a good distribution of the drive engagement force.

For forcing the member 19 away from the member 16, to disengage the clutch, against the force of the springs 20, a circumferential series of axially disposed push-bars 29, 29, preferable three or more, are slidably mounted in holes formed in the hub member 21 and are adapted to bear at their forward ends against the rear race of a ball thrust-bearing 30 interposed between them and the member 19, and at their rear ends to be engaged by the forward race of a ball thrust-bearing 31 which is mounted in an annular bearing cup or oil-retaining shell 32, the two races being slidably mounted upon a cylindrical extension 33 of the transmission case and the rear race being adapted to be engaged by the two arms of a clutch actuating mechanism of which one of the arms is shown at 34.

In the opposite, clutch-engaging movement of the male cone-clutch member 19, under the force of the springs 20, the rubber cushions 14 sustain the force of clutch-engagement, and as an increasing force, until the compressive force in the rubber blocks is equal to and balanced against the clutch-engaging force of the springs 20.

An oil-retaining ring 30ª is mounted with a pressed fit upon a shoulder formed on the hub of the clutch member 19 and is formed with an inwardly extending radial flange overlapping, with suitable play, the right-hand race of the bearing 30.

The employment of the two thrust bearings 30 and 31 avoids dragging of the driving assembly upon the driven assembly when the clutch is disengaged.

In Fig. 4 the construction is substantially the same as that just described except that the pitch of the friction faces is the full 90° of a radial disc clutch. In Fig. 4 the parts, corresponding to parts shown in Fig. 1, except that the clutch shown in Fig. 4 is of the disc type instead of the cone type, are designated by the same numerals as the corresponding parts in Fig. 1, but with the exponent x in each instance.

In Fig. 5 a pair of helical compression springs 35, 35 are substituted for the rubber cushioning members 14 of Fig. 1, the embracing members being suitably formed with spring retaining humps 36, 36 and 37, 37, and the springs being here shown as being embedded in hollow cylinders of rubber, as preferable they are. Such embedding of the springs in rubber provides for damping high frequency vibrations and thus prolonging the life of the springs.

Fig. 6 shows an assembly, especially suitable for air compressor installations, wherein reversal of torque load occurs, with consequent hammering and wear of splines when the driven member is slidably splined upon its shaft. In this assembly the driven structure comprises a cup-shaped stamping 38 having a hub 39 fixedly mounted upon the driven shaft and the shaft is held against endwise movement. The member 38 is formed with radial arms of such small width as to be suitably flexible and so formed and positioned as to be brought into engagement with the outer embracing member 16ª of the driving structure only by the movement of the inner embracing member 19ª, the said arm thus being adapted to spring away from the member 16ª, to a middle position, when the member 19ª is moved to its declutched position, this arrangement assuring immediate and complete separation of the drive surfaces.

The mode of operation has been brought out in, and will be entirely clear from, the foregoing description.

As the springs 15 hold the cushioning members 14 under compression when the clutch is disengaged as well as when it is engaged the cushioning members, when made of rubber, can be simply laid in place and do not require to be adhered to either of the metal members that embrace them.

When the clutch is engaged the cushioning members sustain, in addition to the force of the springs 15, the full clutch-engaging force of the springs 20, and thus are given a good frictional grip upon the metal surfaces that they contact, and because of their V form they transmit the torque in substantial degree by compression from the force-receiving part 10 or 13 of the driving clutch-structure to its force-delivering part 16, and not wholly by sustaining the torque "in shear" as in my copending application above mentioned.

At the same time they are sufficiently yielding to permit substantial shaft mis-alignment without excessive localization of engagement pressure on the friction surfaces.

In the construction shown in Fig. 1 the clutch engaging force is desirably augmented by reason of the conical form of the friction faces although the pitch of those faces is sufficiently high to assure against grabbing, and at the same time the multiple effect of the disc type of clutch is obtained in the engagement of both the inner and outer surfaces of the friction facings.

I claim:

1. The combination of two mating clutch structures, one of the same comprising two rigid members defining between them an obliquely disposed cushion-mounting space and cushion means so mounted in said space, and embraced by said two rigid members for transmission of torque from one to the other of them by compression, as to yield in compression under the force of the torque and also under the force of shaft-misalignment, the cushion-embracing faces of said rigid members overlapping each other in a direction transverse to the circle of revolution so that the cushioning means, by reason of its oblique relation, sustains the torque and also the force of shaft misalignment primarily by compression, and the cushion-mounting space being obliquely disposed with relation to all axial planes of the assembly.

2. The combination of two mating clutch structures, one of the same comprising two rigid members defining between them an obliquely disposed cushion-mounting space and cushion means so mounted in said space, and embraced by said two rigid members for transmission of torque from one to the other of them by compression, as to yield in compression under the force of the torque and also, by reason of its oblique relation, under the force of shaft mis-alignment, said cushion means being so formed and associated, with the cushion-embracing faces of the rigid members overlapping each other in a direction transverse to the circle of revolution, as to transmit at least substantially all of the torque primarily by compression, and the cushion-mounting space being obliquely disposed with relation to all axial planes of the assembly.

3. The combination of two mating clutch structures, one of the same comprising two rigid members defining between them an obliquely disposed cushion-mounting space and cushion means so mounted in said space as to yield under the force of the torque and also under the force of shaft mis-alignment, said cushion means being so formed and associated, with the cushion-embracing faces of the rigid members overlapping each other in a direction parallel to the axis of rotation, as to transmit at least substantially all of the torque and primarily by compression, and clutch-engaging means so urging one of said rigid members toward the other in the clutch-engaging movement as to cause the cushion means to sustain as an increasing compressive force of clutch engagement.

4. The combination of two mating clutch structures, one of the same comprising two rigid members defining between them an obliquely disposed cushion-mounting space and cushion means so mounted in said space as to yield under the force of the torque and also under the force of shaft mis-alignment, said cushion means being so formed and associated, with the cushion-embracing faces of the rigid members overlapping each other in a direction parallel to the axis of rotation, as to transmit at least substantially all of the torque and primarily by compression, and clutch-engaging means so urging one of the rigid members toward the other in the clutch-engaging movement as to cause the cushion means to sustain as an increasing compressive force the force of clutch engagement, and means for maintaining the cushion means under a less compressive force when the clutch is disengaged.

5. A clutch assembly comprising a drive structure and a driven structure adapted to have drive engagement with each other and, mounted operatively between the force-receiving part and the force-delivering part of one of the said structures a torque-cushioning means so angularly disposed with relation to all axial planes of the assembly as to sustain primarily in compression, by reason of its angularity, the torque and also the force resulting from angular misalignment of the axes of the two structures, the torque-cushioning means being of a material having the pertinent characteristics of rubber and being a part of the radially outer one of the two structures.

6. A clutch assembly comprising a drive structure and a driven structure adapted to have drive engagement with each other and, mounted operatively between obliquely disposed and axially and radially overlapping faces of the force-receiving part and the force delivering part of one of said structures, an obliquely disposed cushioning element formed of a material having the pertinent characteristics of rubber and so mounted as to sustain the torque and also the force of clutch engagement primarily by compression, by reason of its oblique relation.

7. A clutch assembly comprising a drive structure and a driven structure adapted to have drive engagement with each other and, mounted operatively between the force-receiving part and the force delivering part of one of said structures, an obliquely disposed cushioning element formed of a material having the pertinent characteristics of rubber and so mounted as to sustain the torque primarily by compression, the said cushioning element being embraced between force-delivering and force-receiving surfaces which are obliquely disposed with relation to all axial planes of the assembly.

8. A clutch assembly comprising a drive structure and a driven structure adapted to have drive engagement with each other and, mounted operatively between the force-receiving part and the force-delivering part of one of the said structures a torque-cushioning means so angularly disposed with relation to all axial planes of the assembly as to sustain primarily by compression the torque and also the force resulting from angular misalignment of the axes of the two structures, the said cushioning means being embraced between force-delivering and force-receiving surfaces which define a space that is substantially of V-shape.

9. The combination of two mating clutch structures, one of the same comprising two rigid members having faces disposed obliquely with relation to all axial planes of the assembly, said faces overlapping each other in an axial direction and in a radial direction and defining between them an obliquely disposed cushion-mounting space and cushion means so mounted in said space as to yield primarily in compression, by reason of the oblique disposition of the space, under the force of the torque and also under the force of shaft mis-alignment, the two mating clutch structures being constructed and arranged for the concurrent engagement of a plurality of full-circle pairs of friction-drive surfaces.

10. The combination of two mating clutch structures, one of the same comprising two rigid members having faces disposed obliquely with relation to all axial planes of the assembly, said faces overlapping each other in an axial direction and in a radial direction and defining between them an obliquely disposed cushion-mounting space and cushion means so mounted in said space as to yield primarily by compression, by reason of the oblique disposition of the space, under the force of the torque and also under the force of shaft mis-alignment, the two mating clutch structures being constructed and arranged for the concurrent engagement of a plurality of pairs of conical friction-drive surfaces.

11. The combination of two mating clutch structures constructed and arranged for the concurrent engagement of a plurality of pairs of conical friction-drive surfaces, one of the structures comprising a torque cushioning element formed of material having the pertinent characteristics of rubber and interposed operatively between obliquely disposed and axially and radially overlapping faces of a force-receiving part and a force-delivering part of the said structure and sustaining primarily in compression the force of clutch-engagement, the torque, and the force of shaft-misalignment.

12. The combination of two mating clutch structures constructed and arranged for the concurrent engagement of a plurality of pairs of conical friction-drive surfaces, one of the structures comprising a torque cushioning element formed of material having the pertinent characteristics of rubber and interposed obliquely between obliquely disposed and axially and radially overlapping faces of a force-receiving part and a force-delivering part of the said structure and adapted, by reason of its oblique relation, to sustain, primarily in compression, the force of clutch engagement, the torque, and the force of shaft-misalignment.

13. The combination of two mating clutch structures constructed and arranged for the concurrent engagement of a plurality of full-circle pairs of friction-drive surfaces, one of the structures comprising a torque cushioning element formed of material having the pertinent characteristics of rubber interposed operatively between obliquely disposed and axially and radially overlapping faces of a force-receiving part and a force-delivering part of the said structure, and so formed and associated as to sustain, primarily in compression, the force of clutch-engagement, the torque, and the force of shaft-misalignment.

14. The combination of two mating clutch structures constructed and arranged for the concurrent engagement of a plurality of pairs of friction-drive surfaces, one of said structures comprising two members interlocked against relative rotation but axially slidable with relation to each other for engaging and disengaging a part of the other structure, and a circumferentially-spaced series of bars extending through a part of, and constrained at all times to rotate with, the said other structure for effecting relative axial movement of the said two members.

15. The combination of two mating clutch structures constructed and arranged for the concurrent enagement of a plurality of pairs of friction-drive surfaces, one of said structures comprising two members interlocked against relative rotation but axially slidable with relation to each other for engaging and disengaging a part of the other structure, and a circumferentially-spaced series of bars extending through a part of the said other structure for effecting relative axial movement of the said two members, the combination including thrust-bearings for the bars at their opposite ends.

16. The combination of two mating clutch structures constructed and arranged for the concurrent engagement of a plurality of pairs of friction-drive surfaces, one of said structures comprising two members interlocked against relative rotation but axially slidable with relation to each other for engagement and disengaging a part of the other structure, and a circumferentially-spaced series of push-bars extending through a part of, and constrained at all times to rotate with, the said other structure for forcing one of the said two members away from the other, and yielding means for constantly urging it in the opposite direction.

17. The combination of two mating cone clutch structures constructed and arranged for the concurrent engagement of a plurality of pairs of circumferential series of friction drive surfaces, one of the same comprising a pair of members mounted for relative axial movement for gripping a part of the other structure, and said other structure comprising a circumferential, always conical series of individually flexible metallic elements free of each other from their outer ends to positions radially inward and at a substantial distance from their clutch-engagement portions and adapted to be sprung into engagement with one of said members by relative movement of the other of said members.

18. The combination of two mating cone clutch structures constructed and arranged for the concurrent engagement of a plurality of circumferential series of friction drive surfaces, one of the same comprising a pair of members mounted for relative axial movement for gripping a part of the other structure, and said other structure comprising a circumferential, always conical series of individually flexible metallic elements free of each other from their outer ends to positions radially inward and at a substantial distance from their clutch-engagement portions and adapted to be sprung into engagement with one of said members by relative movement of the other of said members, the structure that comprises the said members including also cushioning means back of one of the said members and adapted to sustain as an increasing force the force of clutch engagement by reason of the fact that the said members and the said other structure are so mounted as to move toward it in the clutch-engaging operation.

19. The combination of two mating cone clutch structures constructed and arranged for the concurrent engagement of a plurality of pairs of friction drive surfaces, one of the same comprising a pair of members mounted for relative axial movement for gripping a part of the other structure, and said other structure comprising a circumferential, always conical series of individually flexible metallic elements free of each other from their outer ends to positions radially inward and at a substantial distance from their clutch-engaging portions and adapted to be sprung into engagement with one of said members by relative movement of the other of said members, the structure that comprises the said members including also cushioning means back of one of the said members and adapted to sustain the force of clutch engagement by reason of the fact that the said members and the said other structure are so mounted as to move toward it in the clutch-engaging operation, and to transmit at least substantially all of the torque.

20. The combination of two mating clutch structures, one of the structures comprising cushioning means formed of material having the pertinent characteristics of rubber interposed operatively between a force-receiving part and a force-delivering part of the said structure and being so formed and interposed between faces of said parts which overlap circumferential, axially and radially as to sustain primarily in compression the force of clutch engagement, the torque, and the force of shaft-misalignment.

21. The combination of two mating clutch structures, one of the structures comprising cushioning means formed of material having the pertinent characteristics of rubber interposed operatively between a force-receiving part and force-delivering part of the said structure and being so formed and interposed between faces of said parts which overlap circumferentially, axially and radially as to sustain primarily in compression the force of clutch engagement, the torque, and the force of shaft-misalignment, the cushioning means being adjacent the outer periphery of the assembly.

22. The combination of a driving shaft and a driven shaft, two cone-clutch members mounted upon one of them for relative axial movement for frictionally gripping between them a third cone-clutch member mounted upon the other one of the shafts, a third cone-clutch member so mounted and adapted to be so gripped by such movement, means for effecting such movement, the frictionally engaging faces of the three said members being at all times of simple frusto-conical form and all flared in the same direction, and means preventing extensive relative rotary movement of, but permitting axial mis-alignment of, the first-mentioned two members as one thing, and the shaft upon which they are mounted, the parts being so constructed and arranged that all of the three said members move axially, toward the shaft upon which the gripping members are mounted, in the clutch disengaging movement.

23. The combination of a driving shaft and a driven shaft, two cone-clutch members mounted upon one of them for relative axial movement for frictionally gripping between them a third cone-clutch member mounted upon the other one of the shafts, a third cone-clutch member so mounted and adapted to be so gripped by such movement, means for effecting such movement, the frictionally engaging faces of the three said members being at all times of simple frusto-conical form and all flared in the same direction, and resilient means preventing extensive relative rotary movement of, but permitting axial misalignment of, the first-mentioned two members as one thing, and the shaft upon which they are mounted, the parts being so constructed and arranged that all of the three said members move axially, toward the shaft upon which the gripping members are mounted, in the clutch disengaging movement.

THOMAS L. FAWICK.